(12) United States Patent
Jordan et al.

(10) Patent No.: US 9,593,736 B2
(45) Date of Patent: Mar. 14, 2017

(54) CONTROL ASSEMBLY FOR A BICYCLE SHOCK ABSORBER

(75) Inventors: Brian Jordan, Chicago, IL (US); Steven Olds, Colorado Springs, CO (US); Christopher Shipman, Chicago, IL (US); Kevin Wesling, Lombard, IL (US)

(73) Assignee: SRAM, LLC, Chicago, IL (US)

( * ) Notice: Subject to any disclaimer, the term of this patent is extended or adjusted under 35 U.S.C. 154(b) by 670 days.

(21) Appl. No.: 13/047,654

(22) Filed: Mar. 14, 2011

(65) Prior Publication Data

US 2012/0235332 A1  Sep. 20, 2012

(51) Int. Cl.
  *B60G 11/18* (2006.01)
  *F16F 9/46* (2006.01)
  *B62K 25/04* (2006.01)

(52) U.S. Cl.
  CPC ........ *F16F 9/461* (2013.01); *B62K 2025/048* (2013.01)

(58) Field of Classification Search
  CPC .... F16F 9/461; F16F 9/462; F16F 9/48; F16F 9/0236; F16F 9/56; F16F 9/0245; F16F 9/182; F16F 9/443; F16F 9/53
  USPC ............ 267/276, 64.18, 64.22, 64.26, 64.28; 188/319.1, 322.15, 313, 316, 317, 319.2; 280/124, 145, 124.154, 124.155, 124.157, 280/124.164
  See application file for complete search history.

(56) References Cited

U.S. PATENT DOCUMENTS

| | | | |
|---|---|---|---|
| 4,036,335 A * | 7/1977 | Thompson et al. | 188/282.9 |
| 4,052,088 A | 10/1977 | Nicholls | |
| 4,159,105 A | 6/1979 | Vander Laan et al. | |
| 4,337,850 A * | 7/1982 | Shimokura | 188/282.9 |
| 4,579,199 A * | 4/1986 | Nakayama et al. | 188/299.1 |
| 4,928,799 A * | 5/1990 | Zschiesche | 188/314 |
| 5,348,112 A | 9/1994 | Vaillancourt | |
| 5,486,018 A * | 1/1996 | Sakai | 280/124.16 |
| 5,556,082 A * | 9/1996 | Takasaki | 267/218 |
| 6,044,940 A | 4/2000 | Marzocchi et al. | |
| 6,254,067 B1 * | 7/2001 | Yih | 267/64.22 |
| 6,279,703 B1 * | 8/2001 | Mete | 188/319.1 |
| 6,286,642 B1 * | 9/2001 | Yi | 188/319.2 |
| 6,360,857 B1 | 3/2002 | Fox et al. | |
| 7,320,387 B2 * | 1/2008 | Sendrea | 188/285 |
| 2006/0091345 A1 | 5/2006 | Jordan | |
| 2006/0226587 A1 * | 10/2006 | Sendrea | 267/64.28 |
| 2007/0034463 A1 * | 2/2007 | Huang | 188/300 |

(Continued)

FOREIGN PATENT DOCUMENTS

| | | |
|---|---|---|
| DE | 29508612 | 8/1995 |
| GB | 942328 A * | 11/1963 |

*Primary Examiner* — Robert A Siconolfi
*Assistant Examiner* — Mahbubur Rashid
(74) *Attorney, Agent, or Firm* — Milan Milosevic; Lisa Serdynski

(57) ABSTRACT

A control assembly for an in-line bicycle shock absorber can include a control member rotatably mounted to a housing of the shock absorber, the control member having an interior bore, and with one end of the bore being closed and another end of the bore being open. The control assembly also includes a piston slidably mounted within the interior bore of the control member. The control member is rotated to adjust a first characteristic of the shock absorber and the piston is displaced within the interior bore to adjust a second characteristic of the shock absorber.

20 Claims, 6 Drawing Sheets

(56) References Cited

U.S. PATENT DOCUMENTS

2010/0044975 A1\* 2/2010 Yablon et al. ............. 280/5.503
2010/0059964 A1\* 3/2010 Morris ......................... 280/283

\* cited by examiner

SECTION B-B

SECTION A-A

CONTROL ASSEMBLY FOR A BICYCLE SHOCK ABSORBER

BACKGROUND

1. Field of the Invention

The invention relates generally to shock absorbers used on vehicles, for example, bicycles.

2. Description of Related Art

Shock absorbers are known for use with bicycles. These include front fork shock absorbers, as well as rear shock absorbers. Rear shock absorbers are sometimes in the form of a single rear shock absorber mounted between a pivoting rear suspension component and a fixed portion of the frame. The shock absorbers are sometimes in-line shock absorbers with a generally elongated shape and mounting fixture at each end.

Shock absorbers can have a variety of mechanical and operational characteristics, some of which may be adjustable. Examples of characteristics that may be adjustable include rebound damping and compression lockout. However, it has not been convenient to provide control for adjustment of both.

SUMMARY

In light of the present need for control for shock absorbers, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In one embodiment, a control assembly for an in-line bicycle shock absorber is provided, comprising: a control member rotatably mounted to a housing of the shock absorber, the control member having an interior bore, with one end of the bore being closed and another end of the bore being open, the control member rotated to adjust a first characteristic of the shock absorber; and a piston slidably mounted within the interior bore of the control member, the piston displaced within the interior bore to adjust a second characteristic of the shock absorber.

BRIEF DESCRIPTION OF THE DRAWINGS

In order to better understand various exemplary embodiments, reference is made to the accompanying drawings, wherein.

DETAILED DESCRIPTION

Figure 1:
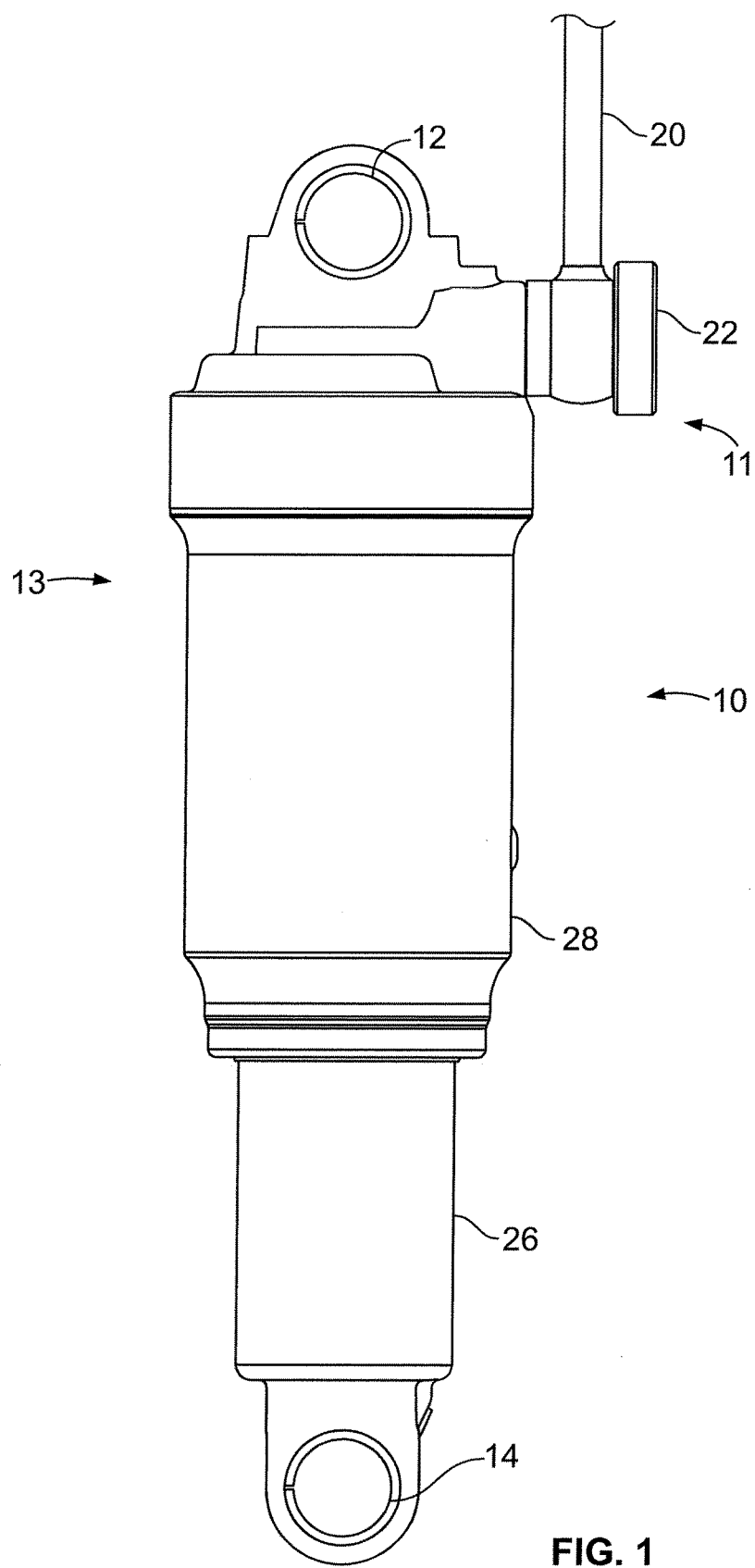
FIG. 1 shows a side view of a shock absorber.
Figure 2:
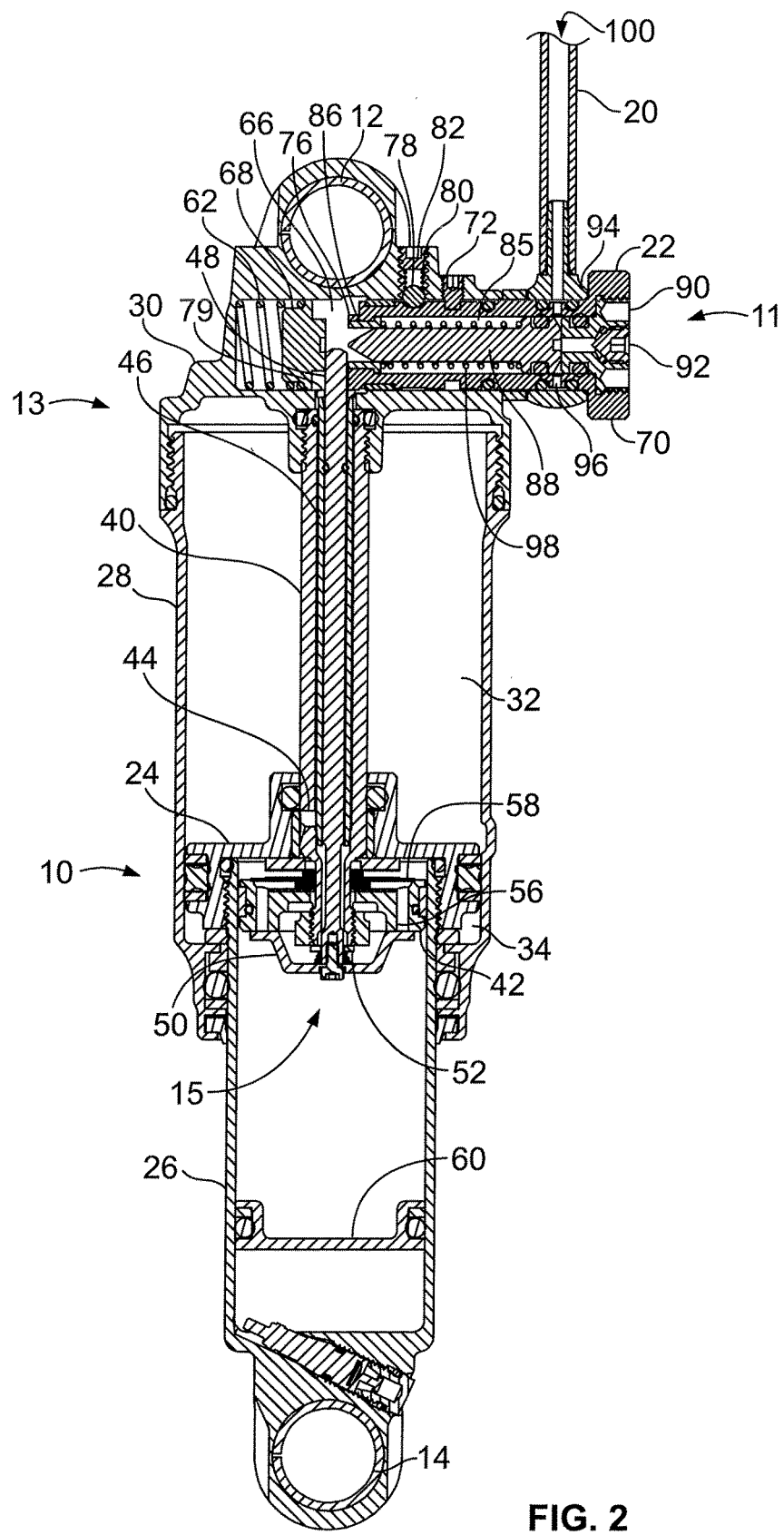
FIG. 2 shows a cross-sectional view of the shock absorber in a "locked-out" state.

Some examples of embodiments will now be described in further detail, with reference to the drawing figures. FIG. 1 shows an embodiment of a shock absorber 10 (referred to herein also as a "shock") which includes a control assembly 11 for adjusting characteristics of the shock absorber 10 such as rebound damping and compression lockout. The shock 10 includes a housing 13 generally including an upper mounting fixture 12, a lower mounting fixture 14, an upper tube 28 and a lower tube 26. The fixtures 12, 14 are generally tubular bushings which are mounted a frame and a suspension component, respectively, of a bicycle. The upper tube 28 generally includes a positive gas chamber 32 and a negative gas chamber 34, and the lower tube 26 generally includes a damping mechanism 15. The upper tube 28 and lower tube 26 can move telescopically in compression or extension to provide shock control to a suspension component. The upper and lower tube arrangement can be considered an in-line type shock absorber.

The positive and negative gas chambers 32, 34 are divided by a gas piston 24 threadably attached to the lower tube 26 and inserted into the upper tube 28. An eyelet 30 is threadably attached to one end of the upper tube 28, and serves to close that end of the upper tube 28. The positive and negative gas chambers 32, 34 are filled with pressurized gas, creating a gas spring that resists axial movements of the gas piston 24 toward the eyelet 30.

The damping mechanism 15 is described as follows. A damper shaft 40 is threadably attached at one end of the eyelet 30, and passes through a hole in the gas piston 24. The other end of the damper shaft 40 is threadably attached to a damper piston 42, which is slidably mounted within the lower tube 26. The damper shaft 40 is hollow, and has a cross-drilled hole 44 that is perpendicular to the axis of the damper shaft 40. The damper piston 42 has a rebound side facing the eyelet 30, and has a compression side facing the opposite direction. A check valve 52 at one end of the damper shaft 40 prevents oil from flowing from the compression side of the damper piston 42. The check valve 52 at one end of the damper shaft prevents oil from flowing from the compression side of the damper piston through the hollow damper shaft 40 to the rebound side of the damper piston 42. The damper piston 42 has small holes 56 between its two faces, and each of these holes 56 is covered at one end by elastically deformable shims 58 located on the rebound side of the damper piston 42.

A separator piston 60 is disposed within the lower tube 26 between the damper piston 42 and a closed end of the lower tube 26. The separator piston 60 is slidably mounted within the lower tube 26. The volume bounded by one side of the separator piston 60, the gas piston 24, and the inner walls of the lower tube 26 is filled with an incompressible fluid, preferably damping oil. The remainder of the volume of the lower tube 26 (i.e. the volume bounded by the other side of the separator piston 60, the inner walls of the lower tube 26, and the closed end of the lower tube 26) is filled with highly pressurized gas. The separator piston 60 serves to separate the oil on one side of the piston 60 from the pressurized gas on the other side of the piston 60. Because the separator piston 60 is freely axially movable within the lower tube 26 it also serves to pressurize the damping oil to the same pressure as the pressurized gas.

Figure 5:
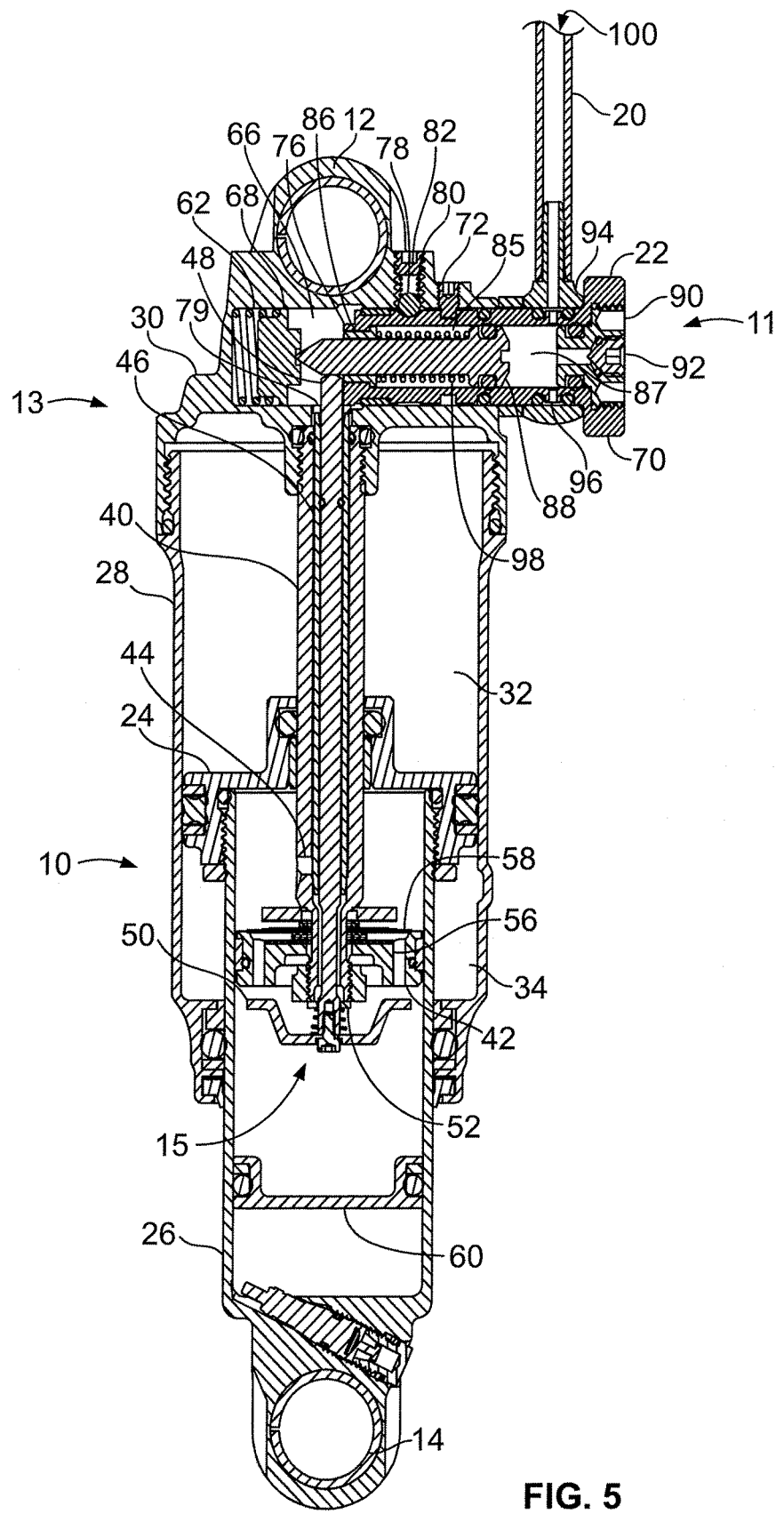
FIG. 5 shows a cross-sectional view of the shock absorber in a "non-locked-out" state.

As shown in FIG. 5, when the shock 10 is compressed (i.e. when the eyelet 30 is moved towards the lower tube 26), the damper piston 42 moves towards the separator piston 60 and damping oil flows through the holes 56 in the damper piston 42 deflecting the shims 58 and passing through to the other side of the damper piston 42. The small size of the holes 56 along with the resistance of the shims 58 to deflection creates a resistance to this flow, and therefore a resistance to compression of the shock 10. The resistance is known as "compression damping."

Figure 4:
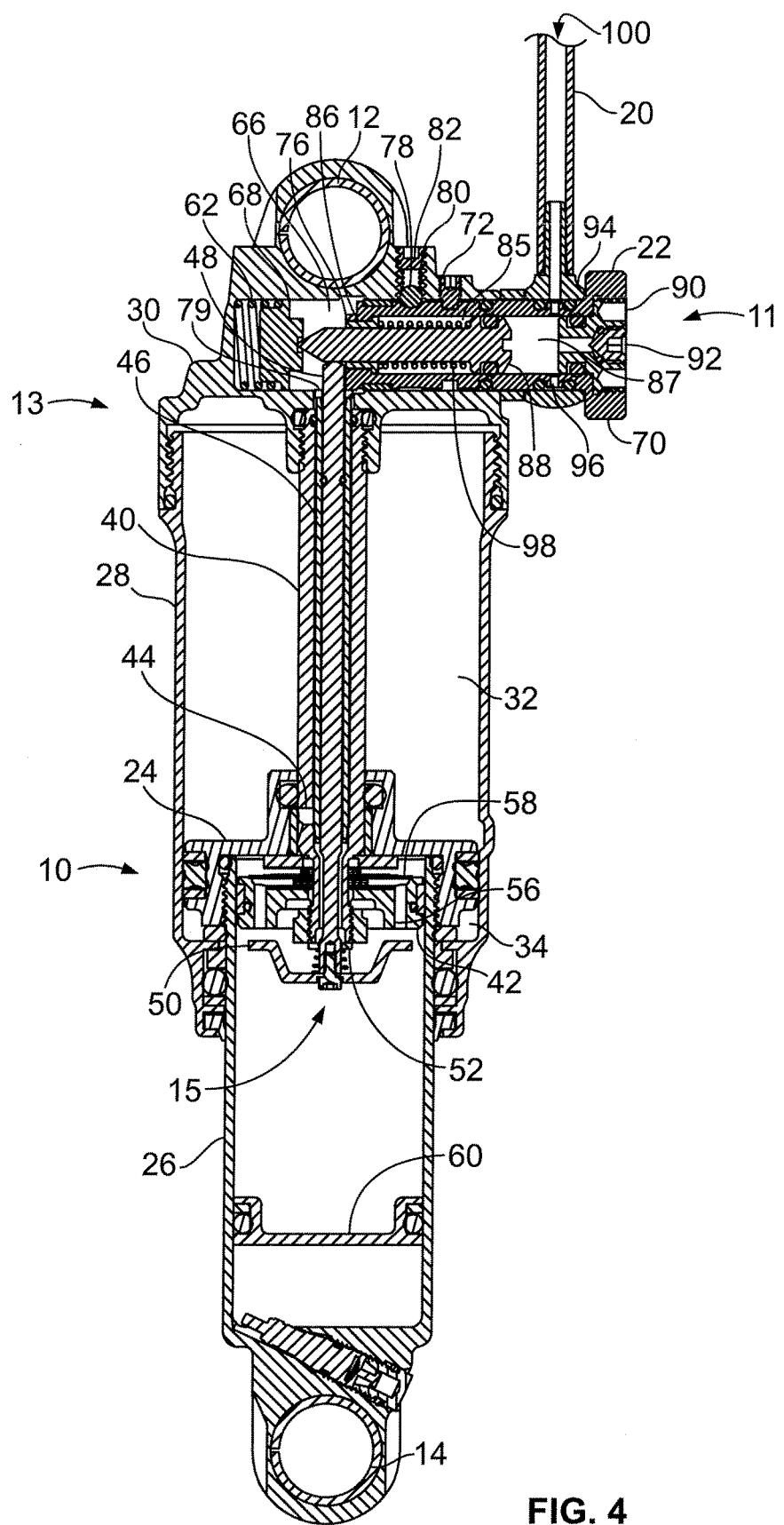
FIG. 4 shows a cross-sectional view of the shock absorber in a "non-locked-out" state.

When the compressive force is removed from the shock 10, the gas pressure in the positive gas chamber 32 urges the eyelet 30, upper tube 28, damper shaft 40, and damper piston 42 to extend from the lower tube 26 back to their original positions as shown in FIG. 4. This urging force pushes the oil that is located on the rebound side of the damper piston 42 through the cross-drilled hole 44 in the damper shaft 40, through the hollow volume of the damper shaft 40, past the check valve 52, and into the volume of the compression side of the damper piston 42.

The control assembly 11 generally includes a control member, in this embodiment a knob 22, a rebound sleeve 46, a lockout piston 88 and a lockout rod 48. The knob 22 is rotatable to affect adjustment of the rebound damping characteristic of the shock 10. The knob 22 is disposed in a bore 66 in the eyelet 30. The knob 22 has a gripping surface 70 and the bicycle rider can rotate the knob 22 by gripping and rotating this surface 70. A knob retaining screw 72 is threaded into the eyelet 30 and engages a groove 74 in the knob 22 preventing the knob 22 from moving axially. Looking to FIG. 6, the groove 74 does not completely wrap around the circumference of the knob 22 but rather has defined ends. These ends act as stops that limit the rotation of the knob 22 to a predefined range. Referring to FIGS. 2-8, the knob 22 has a cam 76 that contacts a washer 79 which, in turn, contacts the rebound sleeve 46 disposed within the damper shaft 40. The pressure of the damping oil in the lower tube 26 urges the rebound sleeve 46 towards the eyelet 30 and the rebound sleeve 46 urges the washer 79 against the cam 76. When the bicycle rider rotates the knob 22, the cam 76 will also rotate, allowing the rebound sleeve to move up, or forcing it to move down, depending on the direction of rotation of the knob 22.

A distal end of the rebound sleeve 46 has a tapered outer diameter and is located immediately adjacent to the cross-drilled hole 44 in the damper shaft 40. The rebound sleeve 46 restricts the flow of oil through the cross-drilled hole 44. By selectively varying the axial position, even with a small or precise degree of variance, of the tapered end of the rebound sleeve 46 relative to the cross-drilled hole 44 the resistance to oil flow can be varied. For example, when the non-tapered portion of the rebound sleeve 46 is adjacent to the cross-drilled hole 44, resistance to oil flow will be greater than when the tapered portion of the sleeve 46 is adjacent to the cross-drilled hole 44. Resistance to oil flow from the rebound side of the damper piston 42 to the compression side of the damper piston 42 is known as "rebound damping".

Figure 6:
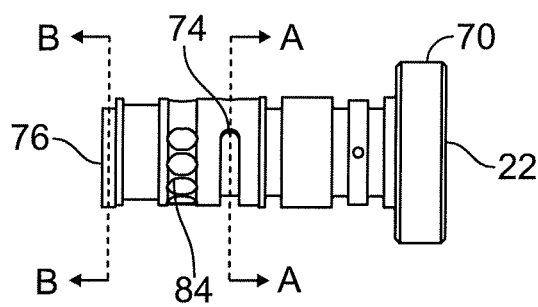
FIG. 6 shows a knob.
Figure 8:
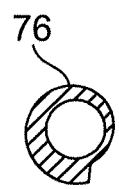
FIG. 8 shows a cross-sectional view of the knob.
Figure 7:
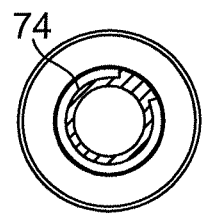
FIG. 7 shows a cross-sectional view of the knob.

The control assembly 11 further includes a detent ball 78 and a detent spring 80 disposed in a threaded hole in the eyelet 30. A spring retaining screw 82 is screwed into the threaded hole, and serves to retain the detent ball 78 and detent spring 80. The detent spring 80 urges the detent ball 78 against the surface of the knob 22. As shown in FIG. 6, the knob 22 has a plurality of shallow recesses 84 disposed circumferentially around the knob 22. When the rider rotates the knob 22, the interaction of the detent ball 78 with the shallow recesses 84 produces a detenting action that can overridably retain the knob 22 in any one of a plurality of predefined angular positions.

Referring to FIGS. 2-5, the lockout piston 88 is disposed in a bore 85 in the knob 22 and passes through a flanged bushing 86. The lockout piston 88 has an enlarged head at one end, and a taper at the other end. A return spring 98 biases the lockout piston 88 to the right in FIGS. 2-5. Additionally, a helper spring 62 may be provided to bias the lockout piston 88 to the right in FIGS. 2-5. The helper spring 62 is disposed at one of the bore 66 in the eyelet 30. A helper spring cap 68 is fitted into one end of the helper spring 62. A plug 90 is threaded into one end of the knob 22 and a bleed screw 92 is threaded into the plug 90. The volume inside the bore 85 between the lockout piston 88 and the plug 90 forms a control chamber 87 which contains hydraulic fluid. The chamber 87 is in fluid communication with a hydraulic control line 20. A fitting 94 commonly known in the art as a "banjo," is disposed around the knob 22 and a first end of the control line 20 is disposed around a barbed projection on the banjo 94. Barbs on the barbed projection serve to axially retain the control line 20 after installation. The banjo 94, along with the control line 20, is freely rotatable around the longitudinal axis of the knob 22. In this way, the banjo 94 and control line 20 can be oriented in whichever angular position is desired, while still maintaining the desired fluid communication of the control line with the shock 10. A second end (not shown) of the control line 20 is connected to a hydraulic pressure actuator schematically depicted as actuator 100, such as for example a handlebar-mounted actuator (not shown) that is described in Patent Publication No. U.S. 2010/0059964 A1, the entire disclosure of which is incorporated herein by reference in its entirety. Cross-drilled holes 96 in the knob 22 allow fluid to communicate between the control line 20 and the interior of the knob 22. Essentially all of the hydraulic fluid in the knob 22 and the chamber 87, and in the control line 20 and the handlebar-mounted actuator 100, can be thought of as one continuous fluid volume.

The lockout rod 48 is disposed inside the rebound sleeve 46 and has a threaded hole at a first end and a chamfer at the other end. A lockout cap 50 is screwed to the first end of the lockout rod 48. The pressure of the damping oil in the lower tube 26 urges the lockout rod 48 towards the eyelet 30. The handlebar-mounted actuator 100 has two positions: a first position in which fluid is allowed to occupy a volume in the actuator 100, and a second position in which some or all of this fluid is forcibly displaced from the actuator 100. As the handlebar-mounted actuator 100 is moved from the first position to the second position, the fluid that is displaced from the actuator 100 forces fluid into the control line 22 and then to enter the volume inside the knob 22. The fluid pushes the lockout piston 88 to the left, so that the taper on the lockout piston 88 continues to move to the left, forces the lockout rod 48 downwards against the force of the pressurized oil in the damping mechanism, and pushes the helper spring cap 68 to the left, thereby compressing the helper spring 62. The contact between the taper on the lockout piston 88 and the end of the lockout rod 48 can be considered a camming contact that translates the motion of the lockout piston 88 that is in one direction into movement of the lockout rod 48 in another direction.

Although an example is illustrated where the lockout piston 88 is a separate component from the lockout rod 48, those two items could be a single integral piece, or could be linked so movement of one affects movement of the other by different connections from the illustrated camming relationship.

When the handlebar-mounted actuator 100 completes the movement from the first position to the second position, the lockout rod 48 contacts the non-tapered portion of the lockout piston 88 as shown in FIG. 4. In this state, the lockout cap 50 is spaced apart from the holes 56 in the damper piston 42, and oil may flow through the holes 56 allowing the shock to compress. As the handlebar-mounted actuator 100 is moved from the second position to the first position, a return spring 98 and the helper spring 62 push the lockout piston 68 to the right in FIGS. 2-5, fluid is expelled from the volume inside the knob 22, and fluid returns to the volume inside the handlebar-mounted actuator 100.

Figure 3:
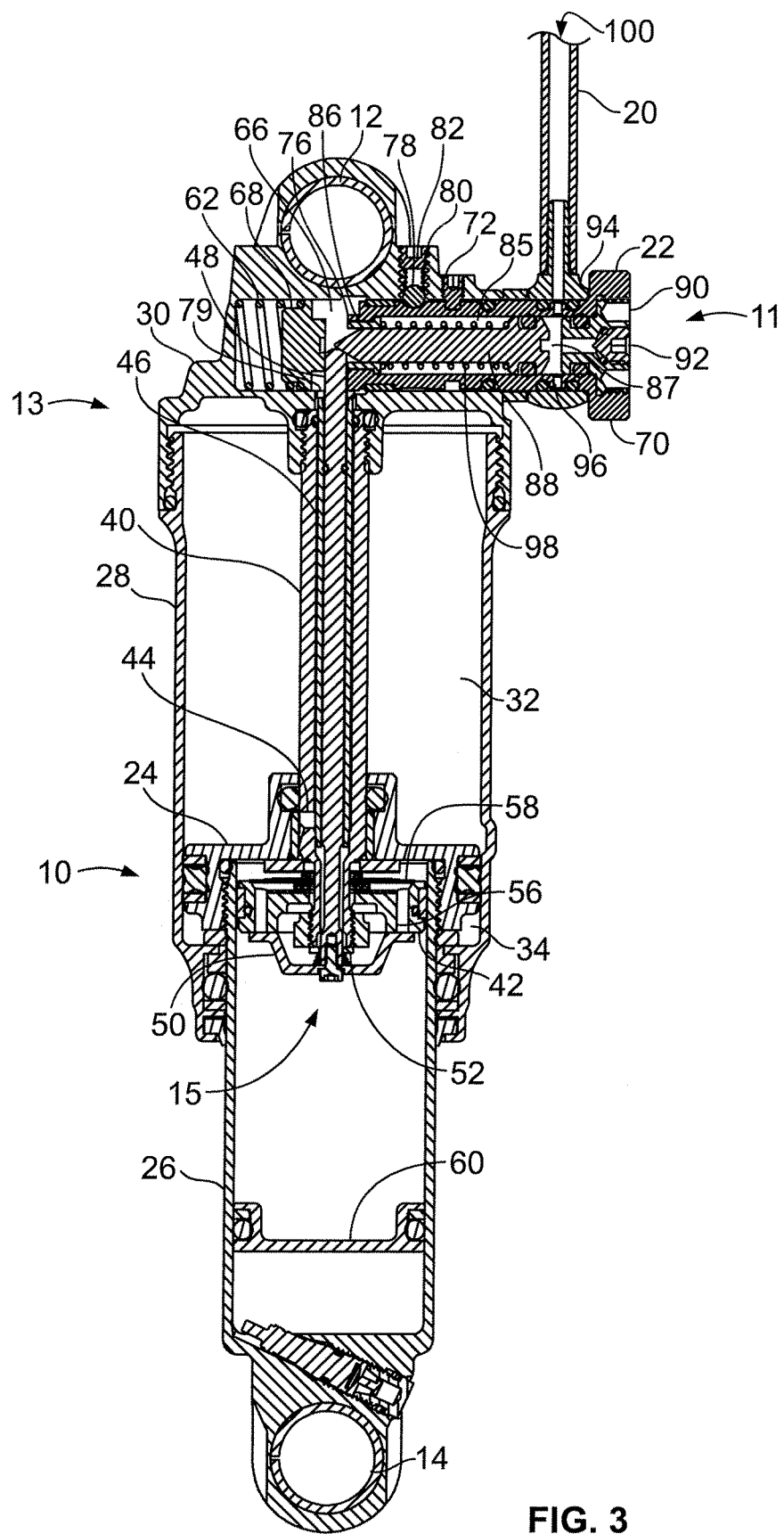
FIG. 3 shows a cross-sectional view of the shock absorber in a "locked-out" state.

In some embodiments, when the lockout rod 48 contacts the non-tapered portion of the lockout piston 88, the force of the return spring 98 alone may be insufficient to overcome this frictional force in order to return the lockout piston 88. The force of the helper spring 62 is additive to the force of the return spring 98 and their total force is sufficient to cause the lockout piston 88 to move against the resistive frictional forces caused by the lockout rod 48 pressing against the lockout piston 88. As the lockout piston 88 moves to the right, the lockout rod 48 once again contacts the tapered portion of the lockout piston 88. At this point, the force exerted by the lockout rod 48 on the lockout piston 88 has a component in the axial direction that urges the lockout piston 88 to the right, and the frictional component that resists axial movement is reduced. As shown in FIG. 3, as the lockout piston 88 continues to move to the right, the helper spring cap 68 contacts the lockout rod 48 and the helper spring 68 no longer exerts a force on the lockout piston 88. The return spring 98 alone, then, continues to push the lockout rod 48 to its home position, shown in FIG. 2, as the handlebar-mounted actuator 100 finishes moving from its second position to its first position. In this position, the lockout cap 50 covers the holes 56 in the damper piston 42 preventing oil flow through the holes, and therefore preventing the shock from compressing. In this state, the shock 10 is said to be "locked out".

In some embodiments, a generally cylidrical rotatable knob 22 is provided, mounted for rotary motion with respect to the shock housing. The knob 22 has a gripping surface at one end that can be manually rotated, and a cam 76 on the other end that effects a change in a characteristic of the shock 10. For example the cam 76 may contact a rebound sleeve 46 or other rebound-related component in the shock 10 to effect adjustment of a first characteristic, in this example the characteristic of rebound damping, by rotation of the knob 22. Such adjustment is an example of one of many shock characteristics that can be adjusted by a rotatable plug according to some embodiments.

Also in some embodiments, the knob 22 has an interior bore 85 with one closed-off or plugged end near the knob 22 and one open end near the cam 76. A piston 88 is movable inside the interior bore 85 and opposed to the closed off end, to form a control chamber 87 inside the knob 22. In some embodiments the piston 88 is generally cylidrical and is coaxial with the knob 22 itself. A control line 20 is in fluid communication with the control chamber 87, and is in fluid communication with a hydraulic actuator 100 to move the piston to contact a lockout rod 48 or other compression lockout related component in the shock 10 to effect adjustment of a second characteristic, in this example the characteristic of compression lockout, by actuation of the hydraulic actuator 100. Such adjustment is an example of one of many shock characteristics that can be adjusted by a hydraulic actuator 100 and piston 88 according to some embodiments.

Depending on the length of the control line 20, the actuator 100 may be considered to be remote from the shock 10 itself. Also, depending on the length of the control line, the first adjustment actuator, which may for example be a knob 22, and be remote from the second adjustment actuator, which may, for example, be a hydraulic actuator 100. Also, in some examples of some embodiments, a first shock characteristic is adjusted by a mechanical actuator and a second shock characteristic is adjusted by a hydraulic actuator. Also, the connection point of the control line may use a swivel feature so the orientation of the control line relative to the knob 22 is movable.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. An in-line bicycle shock absorber control assembly, comprising:
    a control member rotatably mounted to a housing of the shock absorber, the control member having an interior bore, with one end of the bore being closed and another end of the bore being open, the control member rotated to adjust a first characteristic of the shock absorber; and
    a piston slidably mounted in an axial direction within the interior bore of the control member, the piston axially displaced in the axial direction within the interior bore to adjust a second characteristic of the shock absorber, wherein a state of the second characteristic corresponds to the axial position of the piston in the interior bore.

2. The in-line bicycle shock absorber control assembly according to claim 1, wherein the control member is a generally cylindrical knob actuated by rotation relative to the housing, the piston is generally cylindrical and coaxial with the knob.

3. The in-line bicycle shock absorber control assembly according to claim 1, wherein the first characteristic is a rebound damping characteristic.

4. The in-line bicycle shock absorber control assembly according to claim 3, wherein the second characteristic is a compression lockout characteristic.

5. The in-line bicycle shock absorber control assembly according to claim 3, wherein the control member is a knob actuated by rotation relative to the housing.

6. The in-line bicycle shock absorber control assembly according to claim 1, wherein the interior bore includes a control chamber defined by the closed end of the bore and an end of the piston, the control chamber containing hydraulic fluid, the control member having a hydraulic control line configured in fluid communication with the control chamber.

7. The in-line bicycle shock absorber control assembly according to claim 6, further comprising:
    a fluid connector rotatably mounted to the control member to provide rotatable fluid connection of the hydraulic control line with the control chamber.

8. The in-line bicycle shock absorber control assembly according to claim 1, wherein actuation of the piston remotely from the shock absorber housing adjusts the second characteristic of the shock absorber.

9. The in-line bicycle shock absorber control assembly according to claim 1, further comprising:
    a return spring mounted to bias the piston towards the closed end of the interior bore of the control member.

10. The in-line bicycle shock absorber control assembly according to claim 1, wherein the piston has a range of displacement, and further comprising a helper spring mounted to bias the piston towards the closed end of the interior bore of the control member during a portion of the range of displacement of the piston.

11. The in-line bicycle shock absorber control assembly according to claim 6, further comprising a rebound sleeve, the first characteristic is a rebound damping characteristic, the control member has a cam surface disposed proximate the open end of the interior bore, the cam surface slidably contacting the rebound sleeve.

12. The in-line bicycle shock absorber control assembly according to claim 11, further comprising a lockout rod, the second characteristic is a compression lockout characteristic, the piston having a tapered end opposite the control chamber slidably contacting an end of the lockout rod.

13. The in-line bicycle shock absorber control assembly according to claim 6, further comprising a lockout rod, the piston having a tapered end opposite the control chamber slidably contacting an end of the lockout rod.

14. The in-line bicycle shock absorber control assembly according to claim 1, wherein rotation of the control member mechanically adjusts the first characteristic of the shock absorber.

15. The in-line bicycle shock absorber control assembly according to claim 14, further comprising a hydraulic control member mounted remotely from the shock absorber housing in fluid communication to actuate the piston.

16. The in-line bicycle shock absorber control assembly according to claim 15, wherein hydraulic actuation of the piston mechanically adjusts the second characteristic of the shock absorber.

17. The in-line bicycle shock absorber control assembly according to claim 6, wherein the control member is a generally cylindrical knob actuated by rotation relative to the housing, the piston is generally cylindrical and coaxial with the knob.

18. The in-line bicycle shock absorber control assembly according to claim 6, wherein the first characteristic is a rebound damping characteristic.

19. The in-line bicycle shock absorber control assembly according to claim 18, wherein the second characteristic is a compression lockout characteristic.

20. The in-line bicycle shock absorber control assembly according to claim 18, wherein the control member is a knob actuated by rotation relative to the housing.

* * * * *